(12) United States Patent
Seitz et al.

(10) Patent No.: US 12,743,595 B2
(45) **Date of Patent: *Sep. 22, 2026**

(54) RFID TAGS WITH B-FIELD FOCUSING

(71) Applicant: Fortiss, LLC, Los Angeles, CA (US)

(72) Inventors: Forrest S. Seitz, Beaverton, OR (US); Tyler J. Seitz, Portland, OR (US); Joshua K. Hoyt, Portland, OR (US)

(73) Assignee: FORTISS, LLC, Bell Gardens, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/282,670

(22) Filed: Jul. 28, 2025

(65) Prior Publication Data

US 2025/0356149 A1 Nov. 20, 2025

Related U.S. Application Data

(63) Continuation of application No. 18/817,799, filed on Aug. 28, 2024, now Pat. No. 12,387,068.

(60) Provisional application No. 63/579,645, filed on Aug. 30, 2023.

(51) Int. Cl.
*G06K 7/10* (2006.01)
*G06K 19/077* (2006.01)

(52) U.S. Cl.
CPC ... *G06K 7/10475* (2013.01); *G06K 19/07773* (2013.01)

(58) Field of Classification Search
CPC ..................... G06K 7/10475; G06K 19/07773
USPC .......................................................... 235/451
See application file for complete search history.

(56) References Cited

U.S. PATENT DOCUMENTS 10,078,767 B2 9/2018 Tsirline et al.
11,949,156 B2 4/2024 Fernandez De La Fuente et al.
12,524,644 B2 * 1/2026 Mukherjee ....... G06K 19/07779
2005/0212707 A1 * 9/2005 Egbert ..................... H01Q 7/00 343/702

(Continued)

FOREIGN PATENT DOCUMENTS

CN 101043921 A 9/2007
CN 104245066 A 12/2014

(Continued)

OTHER PUBLICATIONS

Related International Search Report and Written Opinion, International Application No. PCT/US2025/017686 filed May 12, 2025, 12 pages.

(Continued)

*Primary Examiner* — Allyson N Trail
(74) *Attorney, Agent, or Firm* — Fountainhead Law Group, PC

(57) ABSTRACT

A radio-frequency identification (RFID) tag includes circuit elements that result in a resonant frequency that differs from the excitation frequency of an RFID reader. The RFID tag, when stacked with other similar RFID tags, channels the magnetic flux density field (B-field) through the stack to power each of the tags in the stack. As a result, the B-Field is collimated in a manner that increases the sensitivity (read range) in one dimension (up a stack of chips) while simultaneously limiting the sensitivity in the two lateral dimensions, thereby providing precise spatial resolution of each tag as to its location on a gaming table.

20 Claims, 10 Drawing Sheets

(56) References Cited

U.S. PATENT DOCUMENTS

| | | | | |
|---|---|---|---|---|
| 2008/0314807 | A1 | 12/2008 | Junghanns et al. | |
| 2009/0051612 | A1 | 2/2009 | Shimizu | |
| 2009/0058607 | A1* | 3/2009 | Hou | H01Q 1/2216 340/10.1 |
| 2012/0262357 | A1 | 10/2012 | Kato et al. | |
| 2014/0235308 | A1 | 8/2014 | Hoyt et al. | |
| 2014/0291399 | A1 | 10/2014 | Koyama | |
| 2021/0011107 | A1 | 1/2021 | Seitz et al. | |
| 2024/0362452 | A1* | 10/2024 | Mukherjee | G06K 19/07749 |
| 2025/0077811 | A1* | 3/2025 | Seitz | G06K 7/10475 |

FOREIGN PATENT DOCUMENTS

| | | | |
|---|---|---|---|
| KR | 20080013213 | A | 2/2008 |
| TW | 200540722 | A | 12/2005 |
| TW | 14224 | A | 1/2024 |
| WO | WO2013098258 | A1 | 7/2013 |
| WO | 202286919 | A1 | 9/2022 |

OTHER PUBLICATIONS

Related Taiwan Application No. 113132879 filed Aug. 30, 2024; First Office Acton with Search Report issued Mar. 11, 2025, English Translation included, 8 pages.

Taiwan Intellectual Property Office, Office Action issued in Taiwan patent application No. 114107450, dated Oct. 14, 2025, 4 pgs.

* cited by examiner

RFID tag
200

RFID tag 300

500

600

700

800

900

1000

RFID TAGS WITH B-FIELD FOCUSING

CROSS REFERENCE TO RELATED APPLICATIONS

The present application is a continuation of U.S. application Ser. No. 18/817,799 for "RFID Tags with B-Field Focusing" filed Aug. 28, 2024, which claims the benefit of U.S. Provisional Application No. 63/579,645 for "RFID Tags with B-Field Focusing" filed Aug. 30, 2023, all of which are incorporated herein by reference.

BACKGROUND

The present invention relates to gaming, and in particular, to radio frequency identification (RFID) tags that, when placed (e.g., stacked) on a gaming table, focus the field of a read transmission through the tag antennas to power the responses from each of the tags on the table.

Unless otherwise indicated herein, the approaches described in this section are not prior art to the claims in this application and are not admitted to be prior art by inclusion in this section.

Gaming generally refers to a competitive contest between two or more entities (e.g., people) using game pieces or tokens. Using electronics to determine or track the locations or types of the game pieces is often more efficient than manually determining or tracking their locations or types. Types of gaming include non-monetary gaming and monetary gaming.

Regarding monetary gaming, tracking the location of gaming tokens in real-time on a gaming table has the potential to revolutionize the gaming industry by providing cash management and improved security. Tying this data to specific players allows casinos to create accurate player profiles while simultaneously alleviating the dealer and pit boss of mundane tasks that take years of training to hone.

Traditional RFID systems have tried to address the gaming market with limited success. In a typical RFID system, the excitation antenna defines a "working volume" within which the energy projected by the antenna is sufficient to power the RFID tag. This "working volume" is generally omnidirectional in nature with poorly defined bounds with radio frequency (RF) power as the only option to adjust the read range. But doing so extends the read range in all directions, introducing cross-talk errors when multiple antennas are in close proximity. Typical RFID products on the market suffer from multiple shortcomings, including being limited to discrete spots (referred to as "betting spots" in a monetary gaming context), having limited gaming token stack heights, having poor discrimination between adjacent spots, and having higher than acceptable read errors.

These shortcomings limit the available technology to games where the spots are widely separated, or to simply identifying counterfeit tokens prior to their use on a gaming table.

A number of patents by the present inventors have been directed toward addressing these shortcomings, as demonstrated in U.S. Pat. Nos. 8,395,525; 8,395,507; 8,432,283; 9,984,528; 11,346,914; and 11,630,964. These patents work in concert to track individual gaming tokens on a gaming table (e.g., in a monetary gaming context, the bets and payouts on typical casino games). To distill these patents as applied to the design of RFID tags to their essence, there are three fundamental concepts that work in concert. The first concept is the presence of a coupling capacitor that extracts only the energy needed from the excitation field sufficient to power the RFID tag. The second concept is tuning the resonance of each tag to a frequency above that of the excitation frequency such that any coupling between tags will move the resonance toward the excitation frequency. The third concept is shaping the B-field generated by the excitation antenna.

The embodiments described in these earlier patents addressed the third concept (shaping the B-field) primarily by using a ferrite core or other high-permeability material in each tag. This ferrite core collimates the B-field by using material properties to increase the flux density in a specific manner.

Ferrite Core Overview

The construction of the ferrite core chips is based on non-resonant coupled induction similar to a typical transformer. This allows RFID technology to exploit near-field coupling with the added benefits including an efficient energy transfer between reader and tags, dynamic beam forming of the H-field as tags are added to or removed from the excitation field, and the capability to resolve spatial coordinates of tags in the excitation field.

The quality factor (also referred to as the "Q factor" or "Q") is a dimensionless parameter that compares the time constant for decay of an oscillating physical system's amplitude to its oscillation period. Equivalently, it compares the frequency at which a system oscillates to the rate at which it dissipates its energy. A higher Q indicates a lower rate of energy dissipation relative to the oscillation frequency, so the oscillations die out more slowly.

Regarding RFID circuits, Q is a measure of the "quality" desired in a well-tuned circuit or other resonator. More specifically, when an RFID tag is driven by a sinusoidal excitation signal, its resonant behavior depends strongly on Q. Resonant systems respond to frequencies close to their natural frequency much more strongly than they respond to other frequencies. An RFID tag with a high Q resonates with a greater amplitude (at the resonant frequency) than one with a low Q factor. The amplitude of the resonant response affects the read range. To increase sensitivity and read range, most existing RFID tags have a relatively high Q. As a specific example, the Q of many existing RFID tags is between 10 and 20.

When multiple tags are in close proximity, however, they interact. This interaction changes their resonant frequency of operation. Instead of a single resonance at the desired frequency, this interaction results in multiple resonances at undesirable frequencies. As a result, tags are not energized and/or data is not successfully exchanged when tags are in close proximity. Various approaches may be used to mitigate this interaction, but these strategies typically reduce the read range. Compensating this reduction in read range by increasing the power output of the reader is possible but not always practical.

The ferrite core tags were designed to meet this need to read RFID tags in close proximity, and to do so with an acceptable read range.

In the inventions based on the ferrite core, the resonance of each individual tag is set to around 50 MHz (vs. 13.56 MHz) with the inductive coupling of multiple tags changing this resonance. The reader is designed to be able to read a single tag even though the tag's resonance is much higher than 13.56 MHz due to its proximity to the excitation antenna. As more chips are added, the overall resonance of the plurality of chips is reduced, moving closer to 13.56 MHz due to the tight magnetic coupling of the ferrite. Thus, as the number of tags increases, the read range is extended with the lower Q of the excitation antenna offset by the inherent efficiency of the ferrite core. As a result, the system operates at low power with significant read range despite tag-to-tag coupling.

Equally important is the ability of the ferrite to direct the H-field away from neighboring tags, as this is what provides spatial resolution and allows one to assign specific tags to specific excitation antennas.

Using monetary gaming as an example, Roulette provides an extreme case: if one player is winning and deemed "hot" by the other players, a bet placed by one person can be quickly followed by others placing the same or similar bets. This results in tall stacks of chips surrounded by other tall stacks of chips. The specific challenges include that the spacing of legitimate betting spots is very close, and that the number of chips on any particular spot can be substantial—with stacks often exceeding 30 chips.

Another important characteristic of virtually all RFID tags is the presence of a protection Zener diode whose job is to protect the rest of the circuit from overvoltage. This protection diode is designed to burn up excess energy as heat—a good idea in most applications but one that is limiting when tags are stacked. The ferrite core system adds passive components to achieve two purposes. The first purpose is achieved by using an inductor to tune out the built-in capacitance of the tag. (Many tags have built-in capacitance to resonate with the antenna coil; tags can be purchased with different capacitance values or with no capacitance at all.) The second purpose is achieved by using a capacitor to lightly couple into the antenna with only the energy needed to power the tag, thereby greatly reducing the effect of the Zener clamp diode and leaving the surplus energy to power other tags instead of being dissipated as heat.

SUMMARY

An embodiment of the present disclosure is directed toward RFID tags that use resonant coupling to focus the B-filed through a stack of tags for improved detection.

In contrast to the embodiments using the ferrite core, the embodiments described herein collimate the B-field in a novel and unexpected way without the need for high-permeability materials. Specifically, the embodiments described herein use careful tuning of each tag using a capacitor across the antenna winding to create a resonant coupling effect. This resonant coupling effect results in a resonance that, when proximal to other similarly-tuned tags, creates a "lensing effect" that collimates the B-field, in a manner analogous to optical lenses that focus energy in one (desired) dimension and minimize the impact in other directions.

This resonant coupling is a novel and unexpected result of having a plurality of carefully tuned RFID tags that interact in a constructive manner.

Additionally, this resonant coupling differs from the non-resonant coupled induction of the existing ferrite core technology.

The potential benefits of the embodiments described herein include a reduced cost-of-goods when manufacturing the tags by eliminating the need for ferrite materials, simplified manufacturing processes, improved performance due to tighter manufacturing tolerances of key components, and improved aesthetics (omitting the exposed ferrite allows for a wide range of decal types and designs).

According to an embodiment, a radio-frequency identification (RFID) tag includes RFID tag electronics, an antenna coupled to the RFID electronics, and a circuit element connected in parallel with the antenna, wherein the circuit element includes a capacitor. The RFID tag has a resonant frequency resulting from the antenna and the circuit element, wherein the resonant frequency of the RFID tag is higher than an excitation frequency of a transmission generated by an RFID reader. The RFID tag is one of a number of RFID tags in proximity in a grouping, wherein the grouping of RFID tags shapes a magnetic flux density field of the transmission generated by the RFID reader through the grouping of RFID tags. The grouping of RFID tags has a resonant frequency that is lower than the resonant frequency of each of the RFID tags considered individually due to resonant coupling. The transmission generated by the RFID reader powers the RFID tag electronics via the resonant coupling.

The following detailed description and accompanying drawings provide a further understanding of the nature and advantages of embodiments of the present invention.

DETAILED DESCRIPTION

Figure 1:
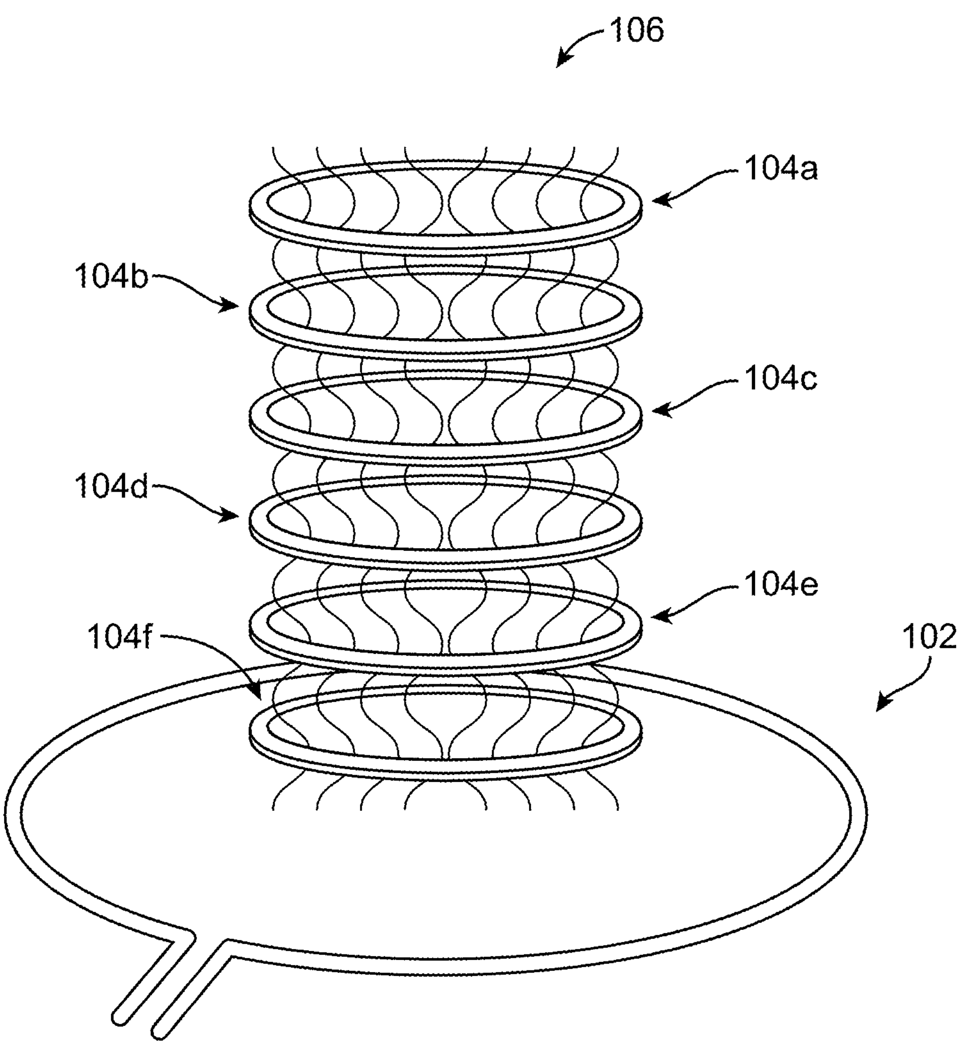
FIG. 1 is a perspective view showing an example of the resonant coupling effect collimating the B-field.

Described herein are techniques for constructing RFID tags that use resonant inductive coupling. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

In the following description, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

In this document, the terms "RFID tag", "RFID gaming tag", "RFID chip", "RFID gaming chip", "gaming chip", and "gaming token" are used. Such terms are to be read as being broadly synonymous. (More precisely, an "RFID chip" may be used to refer to the integrated circuit components of the "RFID tag", which also includes additional components such as an antenna, a rigid housing, etc. However, this document is mostly concerned with the broad usage for these terms.) The RFID tag responds to a radio frequency signal from the RFID reader, generally with its serial number or other identifier, enabling the RFID reader to obtain an inventory of the RFID tags in the vicinity. In a gaming context, the RFID gaming tags may be placed on, removed from, or moved around on a gaming table, according to various game rules. The RFID gaming tags may also be used in a monetary gaming context where the tags may be marked with a value identifier (e.g., $1).

To provide example for comparison, this patent disclosure includes a summary description of existing RFID tags based on shaping the B-field using a ferrite core as a baseline to describe the astounding performance of the new resonant coupling embodiments. The detailed implementation of the resonant coupling embodiments has multiple design degrees-of-freedom, including (but not limited to) the geometry of the antenna (size, shape, number of turns), the capacitor values, and the spacing between tags (e.g., the thickness of each gaming token). While the embodiments described in this document focus on its application to the design of RFID-enabled 39 mm gaming tokens, the resonant coupling is a physical phenomenon—heretofore never documented—that is not limited to just one geometry. Embodiments for 43 mm gaming tokens will vary from designs for 39 mm gaming tokens. Similarly, this concept can be applied to "plaques" of varying sizes and thicknesses. For example, in a monetary gaming context, the embodiments may be implemented in Pai Gow tiles as well as the betting tokens.

Resonant Coupling Overview

Unlike flux density concentration enhanced by the presence of ferrite materials, the present disclosure is based on the physics of resonant inductive coupling (also called magnetic phase synchronous coupling or resonant coupling). This phenomenon exploits inductive coupling between a source and a secondary load. Resonant inductive coupling is the near-field wireless transmission of electrical energy between magnetically coupled coils, which is part of a resonant circuit on a tag tuned to resonate at the same frequency as the driving frequency. Specifically, the efficiency of the energy transfer between the driving coil and the receiving coil is dramatically improved when the secondary load is tuned to resonate at the excitation frequency. To maximize the efficiency of this energy transfer, the resonance circuit has a very high Q. This increase in energy transfer efficiency shapes the B-field with the net effect of directing the B-field in a controlled manner.

Resonant inductive coupling (RIC) was first demonstrated by Nikola Tesla in 1894 and has been successfully employed by others in a range of applications including a notable demonstration of wireless power transfer by Marin Soljačić of MIT in 2007.

Regarding wireless power transfer, traditional wireless charging techniques use a pair of coils—one on a charging pad or dock and one in the device to be charged—with a small air gap between them. The work done by Soljačić as well as researchers at Aalto University in Finland (Physical Review published 20 Jul. 2023) have shown that careful tuning of the antenna loops can achieve power transfer efficiencies of 80% while minimizing radiation losses with air gaps of several inches. Additional work is being done to apply this idea to charging vehicles in motion. In all cases, the target application is trickle charging at a distance.

Regarding RFID, the resonant inductive coupling phenomenon has also been applied—in very limited and specific use cases—to data transmission from individual active circuits (e.g., implantable medical devices) as well as passive circuits (e.g., passports and contactless smart cards). However, all of these applications use well-established techniques outlined in numerous manufacturer's application notes (e.g., "RFID Coil Design", Microchip application note 00678b.pdf). Specifically, the secondary circuits are tuned to the excitation frequency (e.g., 13.56 MHz) with a very high Q to maximize read range sensitivity. All known current applications—as noted—have been limited by the same issues that plagued all RFID applications that have tried to read multiple closely spaced tags in the excitation field: The tags will couple and de-tune to where the resonance frequency of the tags falls outside the band of the RFID reader and are therefore not read.

Our previous inventions—which centered on the ferrite core—overcame this fundamental limitation by increasing the energy transfer efficiency between excitation antenna and RFID tags. This allowed de-tuning of the resonance of the individual tags—thereby making them insensitive to resonance shifts caused by coupling.

Resonant Coupling Embodiments

The embodiments described in the present disclosure use tight coupling (similar to a coreless transformer) between a source (in our case, an excitation antenna) and a receiver (in our case, one or more RFID tags). However, there are several important differences from typical RIC used for charging at a distance or reading a smart card. A first difference is that an embodiment uses the efficiency of the excitation channel to transmit information to/from multiple RFID tags instead of a single charging coil/tag. A second difference is that an embodiment operates with a well-defined distance between the excitation coil and the tags. A third difference is that the tags are uniformly spaced in an embodiment. A fourth difference is that an embodiment has a fundamentally different design of the passive tag antenna than a traditional RFID tag. A fifth difference is that an embodiment exploits the coupling between tags to focus the B-field to further improve the efficiency of the energy and data transfers. (Note that a given embodiment may have one or more of the above differences from typical RIC.)

As noted earlier, the embodiments described herein may incorporate a number of features from earlier patent applications by the present inventors. One similar feature is the design of tags tuned to a (higher) non-optimum frequency such that a reader is able to read a single tag as well as able to read multiple tags even though the resonance of the plurality of tags has shifted their resonant frequency due to coupling between tags. Another similar feature is the use of a series capacitor to lightly couple the tag antenna to the RFID tag to limit the impact of the overvoltage protection.

The embodiments described in the present disclosure have one key difference when compared to the earlier work based on a ferrite core: The tight coupling between the excitation antenna and the plurality of tags is achieved without the need for ferrite (or other flux concentrating materials). This tight coupling is achieved by tuning the tag antennas with an additional capacitor across the antenna loop. The present disclosure describes embodiments that tunes this LC (inductance-capacitance) circuit in a manner that shapes the B-field. Furthermore, when this tuning is to a higher frequency than the peak sensitivity of the reader (e.g., 24 MHz) where the reader is still able to read a single tag—largely due to its proximity to the excitation antenna, a plurality of tags can still be read because the coupling between tags has moved (e.g., lowered) the resonant frequency of interest to be close to the primary excitation frequency (e.g., 13.56 MHz).

As a consequence of the resonant coupling, when multiple tags are similarly tuned (e.g., to 24 MHz), the B-field is shaped—much like an optical lens—such that the flux is highly collimated. As a result, embodiments may have greatly increased efficiencies in energy coupling and robust energy (and data) transfer even when this coupling amongst multiple tags has shifted the resonant frequency of the tags, thereby collimating the B-field in a manner that allows precise determination of the spatial coordinates of each tag.

FIG. 1 is a perspective view showing an example of the resonant coupling effect collimating the B-field. FIG. 1 includes an antenna 102 and a number of RFID tags 104 (individually 104*a*-104*f*). The antenna 102 may be implemented in a gaming table (not shown) on which the RFID tags 104 are used for gaming purposes. The RFID tags 104 may be non-optimally tuned, e.g. to 24 MHz for a primary excitation frequency of 13.56 MHz. The RFID tags 104 are shown without their housing, to show how the thickness of each tag provides consistent (e.g., uniform) spacing between the tags and how the antenna and other components produce the resonant coupling to collimate a B-field 106 (shown as the wavy vertical lines). Surprisingly, this resonant coupling collimates the B-field in a manner similar to that provided by ferrite core RFID tags, but without requiring the ferrite core. The resulting increased efficiency and the proximity of the closest tag to the excitation field is what allows for the non-optimum tuning of the tags—thereby eliminating the sensitivity to coupling amongst the plurality of tags.

Clearly, uniform geometry of the tags adds to predictability of performance, but other embodiments may be used in other applications. The characteristics of the components used may be adjusted as needed in each other application.

Figure 2:
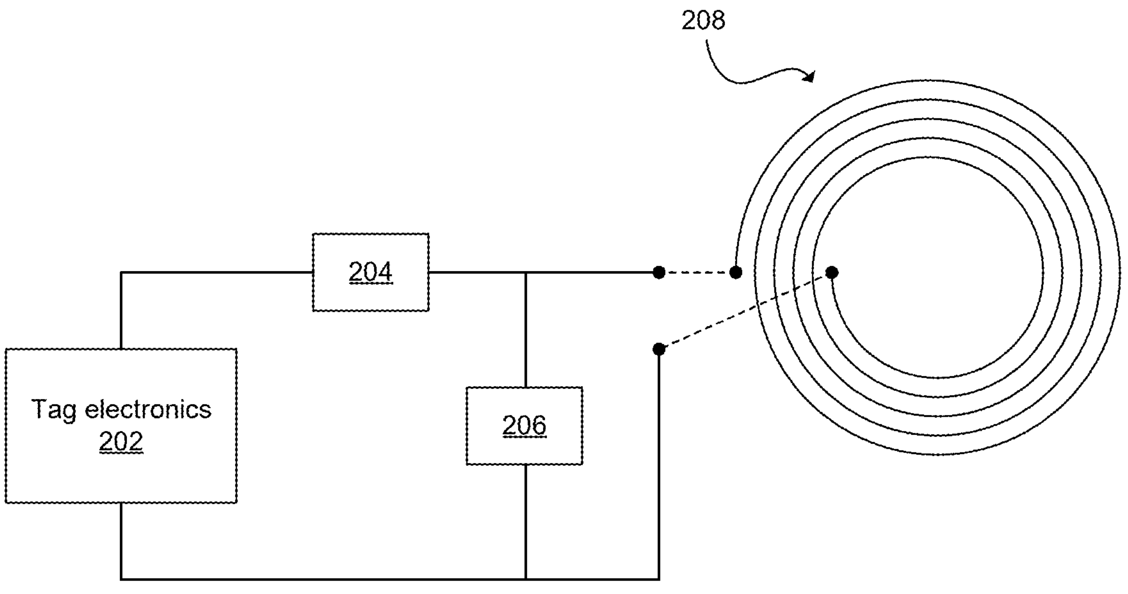
FIG. 2 is a block diagram of an RFID tag 200.

FIG. 2 is a block diagram of an RFID tag 200. The RFID tag 200 includes tag electronics 202, a series circuit element 204, a parallel circuit element 206, and an antenna 208. The RFID tag 200 may also include a housing (not shown) to give the RFID tag 200 the form factor of a gaming token, e.g., a circular shape, a rectangular shape, etc., in various sizes. As a specific example, the housing may provide the RFID tag 200 with a circular form factor having a diameter of 39 mm.

The tag electronics 202 generally implements the RFID functionality for the RFID tag 200. The tag electronics 202 may be provided by an existing, commercially available RFID tag electronics integrated circuit. As a specific example, the tag electronics 202 may correspond to a ICODE ILT-M RFID integrated circuit from NXP Semiconductors that implements the ISO 18000-3 mode 3 RFID standard.

The series circuit element 204 generally provides the tag electronics 202 with power received at the antenna 208 in the excitation signal from an RFID reader (not shown). The tag electronics 202 includes an overvoltage protection circuit (not shown; e.g., a Zener diode) to protect the other circuit structures of the tag electronics 202 from an overvoltage condition. In a typical RFID use case, the RFID reader is intending to only read a single RFID tag, so the RFID tag electronics 202 includes the protection circuit to dissipate as heat the excess energy received in the excitation signal from the reader. However, in a use case like gaming where the RFID reader may read multiple RFID tags, the series circuit element 204 functions to lightly couple the tag electronics 202 to the energy received by the antenna 208. As a result, the tag electronics 202 receives only a portion of the total energy from the RFID reader, and the remainder of the energy is able to be received by other RFID tags nearby. In an embodiment, the series circuit element may include a capacitor, referred to as the series capacitor. As an example, the series capacitor may be 3.9 pF. The series circuit element 204 may also include other circuit structures, as discussed below.

The parallel circuit element 206 generally includes a capacitor operating as a tuning capacitor that, in combination with the antenna 208, results in the resonant frequency of the RFID tag 200. For example, for the given antenna 208, a capacitance of 22 pF for the parallel circuit element 206 results in a resonant frequency of 24 MHz for the RFID tag 200. In such a case, the parallel circuit element 206 may be referred to as the parallel capacitor.

The antenna 208 generally receives the read signal and other communications from the RFID reader. The antenna 208 is shown as a circular loop antenna with 5 turns, an outer diameter of 30.5 mm, and an inner diameter of 25.4 mm, making it suitable for use with an RFID tag having a circular form factor with a diameter of 39 mm.

As further detailed below, the RFID tag 200 has a resonant frequency resulting from the antenna 208 and the parallel capacitor 206, where the resonant frequency of the RFID tag is higher than an excitation frequency of a transmission generated by the RFID reader. In general, the resonant frequency of the RFID tag 200 is between 1.5 and 2.2 times the excitation frequency of the transmission generated by the RFID reader. For example, the resonant frequency of the RFID tag 200 may be 24 MHz, and the transmission generated by the RFID reader may be 13.56 MHz. Such a difference is considered inefficient for the single RFID tag case, however in a gaming environment the closeness of the RFID tag 200 to the RFID reader means that the inefficiency of the received signal power is still sufficient for operation of the RFID tag 200.

However, when the RFID tag 200 is one of a number of similar RFID tags in proximity in a grouping, the grouping shapes a magnetic flux density field of the transmission generated by the RFID reader through the grouping. As a result of the resonant coupling, the grouping has a resonant frequency that is lower than that of the RFID tag 200 considered by itself.

In a gaming context, proximity generally means that the RFID tags are located within a single, defined gaming spot. Generally each gaming spot is associated with an antenna that is connected to the RFID reader, and the RFID reader reads all of the RFID tags nearby that antenna (e.g., all the RFID tags located in the corresponding gaming spot). In a monetary gaming example, a Roulette table may have a gaming spot for each of the bets that are available to be made (e.g., over 100 gaming spots).

In a gaming context, grouping generally means that the RFID tags are together within a bounded area and are to be treated equivalently in the specific gaming environment. Generally the bounded area corresponds to a gaming spot, and the grouping may be a stack (see FIG. 1) or a pile. Generally the tags in a stack are fully overlapping, but they may also be partially overlapping. Generally the tags in a pile are partially overlapping. As discussed above, the grouping results in the resonant coupling among the RFID tags collectively. The coupling is most efficient for the stack, but it also occurs for the pile, with the efficiency increasing as the amount of overlapping increases.

As a result of the resonant coupling, the transmission generated by the RFID reader powers the tag electronics 202 to perform RFID operations.

The size and configuration of the antenna 208, and the capacitance of the parallel capacitor 206, may be adjusted as desired to achieve different resonant frequencies for the RFID tag 200. Further example configurations for the antenna 208 and the parallel capacitor 206 are discussed below. Additionally, other components may be added to the RFID tag 200 to change its resonant frequency, as desired.

Figure 3:
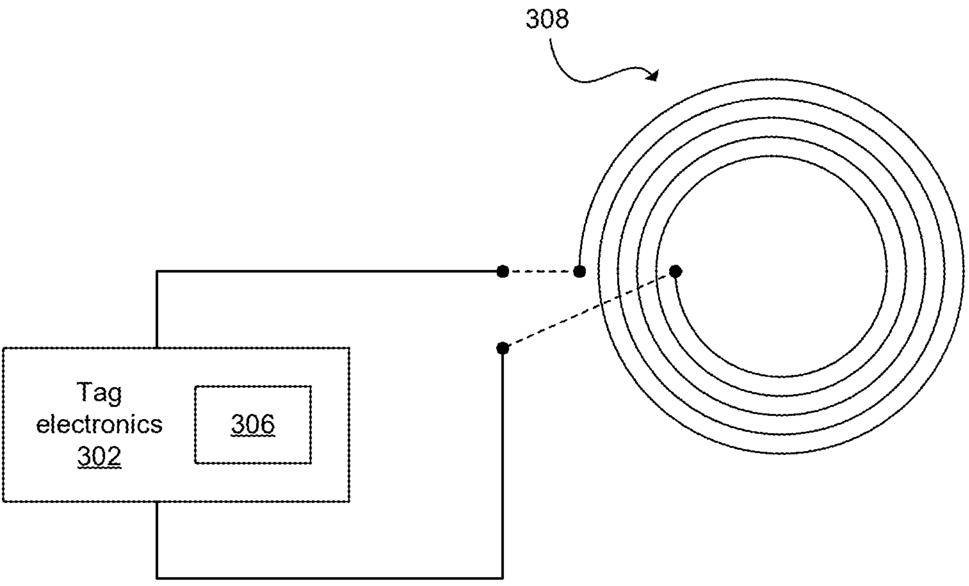
FIG. 3 is a block diagram of an RFID tag 300.

FIG. 3 is a block diagram of an RFID tag 300. The RFID tag 300 includes tag electronics 302, a parallel capacitor 306, and an antenna 308. The RFID tag 300 is similar to the RFID tag 200 (see FIG. 2), except that the tag electronics 302 is customized for the resonant coupling embodiments, whereas the tag electronics 202 uses existing commercially available RFID integrated circuitry.

More specifically, the tag electronics 302 omits the over-protection circuit (e.g., Zener diode) that was present in the tag electronics 202. As a result, the series circuit element 204 is not needed in the RFID tag 300. In addition, the parallel capacitor 306 has been included as a component of the tag electronics 302, instead of being a separate element as with the parallel capacitor 206. For example, the desired capacitance may be provided by metal layers deposited on a non-conductive film, also referred to as the RFID inlay. The antenna 308 is generally similar to the antenna 208.

As with the RFID tag 200, the parameters of the components of the RFID tag 300 including the parallel capacitor 306 and the antenna 308 may be adjusted as desired to adjust the resonant coupling effect, including adjusting the resonant frequency of the RFID tag 300. As further detailed below, the number of turns of the antenna 308 and the capacitance of the parallel capacitor 306 have an inverse relationship, so for a large number of turns the capacitance of the parallel capacitor 306 (or 206) may be reduced due to the increase in inductance of the antenna 308.

The RFID tag 200 and the RFID tag 300 both leverage previous experience (e.g., U.S. Pat. No. 11,346,914) in which the increased efficiency of the modified B-field (whether generated by ferrite materials or by resonant inductive coupling) allows an RFID reader to work irrespective of changes in resonance caused by coupling between tags. While the extent of the coupling between ferrite core (FC) tags and resonant inductive coupling (RIC) tags is markedly different, the results can still be used to achieve the desired goals of the gaming application; specifically, to correctly assign a plurality of tags to their respective antennas with a spatial resolution sufficient to track individual gaming tokens on a gaming table. As a specific monetary gaming example, a Roulette table using the RFID tags 200 or 300 may track individual bets at each of the 100 or more betting spots.

Figure 4:
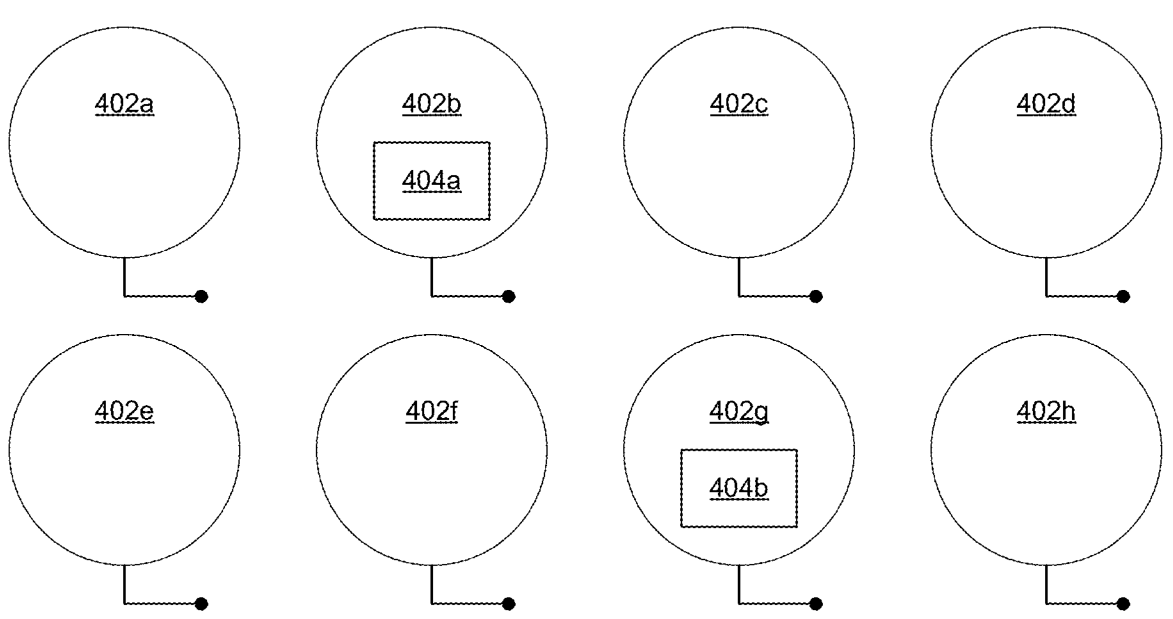
FIG. 4 is a block diagram of an RFID system 400.
Figure 4:
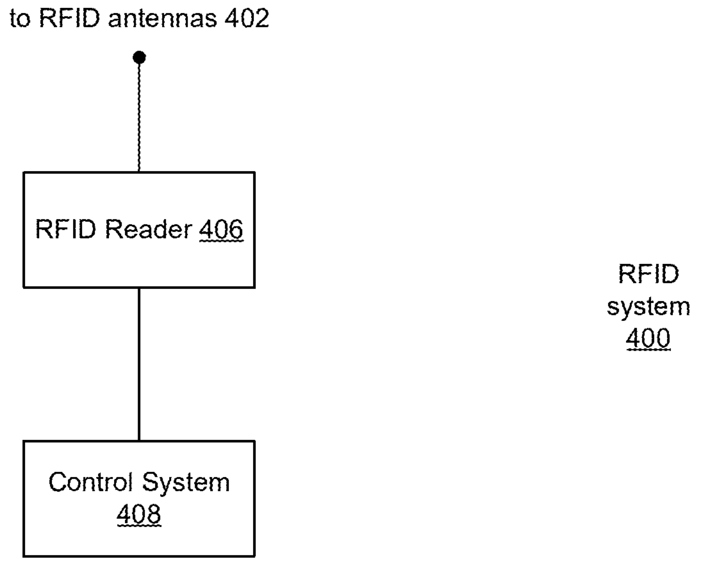

FIG. 4 is a block diagram of an RFID system 400. The RFID system 400 generally operates with the resonant coupling gaming tokens described herein, e.g. the RFID tag 200 (see FIG. 2), the RFID tag 300 (see FIG. 3), etc. The RFID system 400 may be implemented in a gaming table. As a specific monetary gaming example, the RFID system 400 may be implemented in a Roulette table. The RFID system 400 includes a number of RFID antennas 402, a number of RFID tags 404, one or more RFID readers 406, and a control system 408. The RFID system 400 may also include other components that (for brevity) are not described in detail.

The RFID antennas 402 (8 shown, 402*a*-402*h*) are arranged at various locations on the gaming table. In general, each of the RFID antennas 402 is associated with one of the gaming spots on the gaming table. However, more than one RFID antenna may be associated with a single gaming spot, for example a large gaming spot may have multiple smaller antennas instead of a single large antenna.

Each of the RFID tags 404 generally corresponds to a resonant coupling gaming token described herein, e.g. the RFID tag 200, the RFID tag 300, etc. The RFID tags 404 may be placed around the gaming table in the various gaming spots corresponding to the RFID antennas 402. Two groupings of RFID tags are shown, 404*a* and 404*b*.

The one or more RFID readers 406 connects to the RFID antennas 402. (To reduce clutter in the figure, the complete connecting line to each of the antennas 402 is not shown.) Each of the one or more RFID readers 406 may connect to more than one of the RFID antennas 402, for example via a multiplexer or switching network (not shown). The one or more RFID readers 406 may be a single RFID reader in certain embodiments, for example when the number of the RFID antennas 402 is small or the single RFID reader operates sufficiently quickly in a given gaming environment.

In general, the one or more RFID readers 406 (referred to as the RFID reader 406 for brevity) generates an excitation signal that it transmits via the RFID antennas 402; any of the RFID tags 404 that receive the excitation signal then communicate with the RFID reader according to their RFID protocol. As discussed above, the RFID tags 404 are each tuned to a higher resonant frequency than that of the excitation signal generated by the RFID reader 406, but due to the resonant coupling effect, a grouping of the RFID tags 404 has a lower resonant frequency and thus more closely matches that of the RFID reader 406. The excitation signal for RFID transmissions is generally 13.56 Mhz, but similar results may be obtained using a nearby excitation frequency, for example between 13 and 14 MHz. As a specific example, the RFID reader 406 may generate a signal at 13.56 MHz and the RFID tags 404 may be tuned to 25 MHz; but a grouping of the RFID tags 404 will have a lower resonant frequency than 25 MHZ, with the exact resonant frequency depending upon the number of tags in the grouping, the arrangement of the tags in the grouping, etc. Furthermore, as shown in FIGS. 5-10, the resonant frequency may include multiple resonant frequencies, with embodiments using the strongest resonant frequency, which may also be the lowest resonant frequency. Other embodiments may use other resonant frequencies, as desired, according to the sensitivity of the RFID reader.

The control system 408 generally controls the operation of the RFID system 400. For example, the control system 408 may control the RFID reader 406 to send a read signal via a selected one of the RFID antennas 402. The subset of the RFID tags 404 in the gaming spot associated with the selected RFID antenna respond with their tag identifiers, and the control system 408 associates those tag identifiers with the gaming spot associated with the selected RFID antenna. In this manner, the RFID system 400 tracks the location of the RFID tags 404 on the gaming table. As another example, the control system 408 may control the operation of a multiplexer or switching network (not shown) to connect the RFID reader 406 to the selected one of the RFID antennas 402. A processor and a memory, for example as implemented in a computer, may perform the functions of the control system 408.

The RFID system 400 may operate with other features described in other patent applications by the present inventors. For example, the RFID system 400 may operate with the network analyzer system described in U.S. Pat. No. 10,430,621. As another example, the RFID system 400 may operate with the antenna array system described in U.S. Pat. No. 10,088,547. As another example, the RFID system 400 may operate with the network analyzer and controllable reactance network system described in U.S. Pat. No. 11,630, 964. As another example, the RFID system 400 may operate with the SPEEDscan systems described in U.S. patent application Ser. No. 18/665,943 filed May 16, 2024 for "Determining the Locations of RFID tags".

Performance Characterizations

As discussed above, the RFID tag 200 and the RFID tag 300 may be implemented as circular gaming tokens having a diameter of 39 mm. This form factor is not limiting, and the shape and size may be adjusted as desired for other gaming environments. For example, the size of the token may be increased (e.g., to 43 mm) or decreased (e.g., to 35 mm). The shape of the token may be changed, e.g. to square or rectangular. The thickness of the token may be changed, for example increased (e.g., plaques, dominoes or tiles) or decreased. As a specific monetary gaming example, the resonant coupling feature of the RFID tag 200 and the RFID tag 300 may be implemented in Pai Gow tiles.

For a given gaming application, the size and shape of the gaming token may be defined, but other variables are available for adjustment as desired to provide the desired resonant frequency for the resonant coupling effect. These design variables include the antenna geometry (size, shape, number of turns, etc.), the tuning (e.g., the capacitance of the parallel capacitor, and the inductance, capacitance and resistance of other components) that results in a given resonant frequency, and the separation distance between tags (e.g., the thickness of each gaming token). The following tables and figures explore these options.

Comparisons Between Token Types

The following paragraphs describe the performance differences between various token types. The experimental setup defined the 0 dB loss as follows. The output port of a network analyzer was connected to a single turn magnetic sensing loop having a diameter of 22 mm. The receive port of the network analyzer was connected to another single turn magnetic sensing loop having a diameter of 22 mm. These loops were placed on top of one another with a spacing of 0.7 mm therebetween.

As a baseline case, consider the transmission loss from bottom to top for various stack heights of tokens that have no RFID circuitry. Between 10-30 MHz, these tokens show a generally constant transmission loss that increases with stack height. For example, a stack with 1 token has a transmission loss of around −6 dB at the top of the stack, with 5 tokens has a loss of around −21 dB, with 10 tokens has a loss of around −36 dB, with 15 tokens has a loss of around −44 dB, and with 20 tokens has a loss of around −50 dB.

For the ferrite core case, the transmission loss is less than the baseline case, as expected. Between 10-30 MHz, the ferrite core tokens show a generally constant transmission loss that increases with stack height. For example, a stack with 1 token has a transmission loss of around −4 dB at the top of the stack, with 5 tokens has a loss of around −14 dB, with 10 tokens has a loss of around −19 dB, with 15 tokens has a loss of around −22 dB, and with 20 tokens has a loss of around −26 dB.

Figure 5:
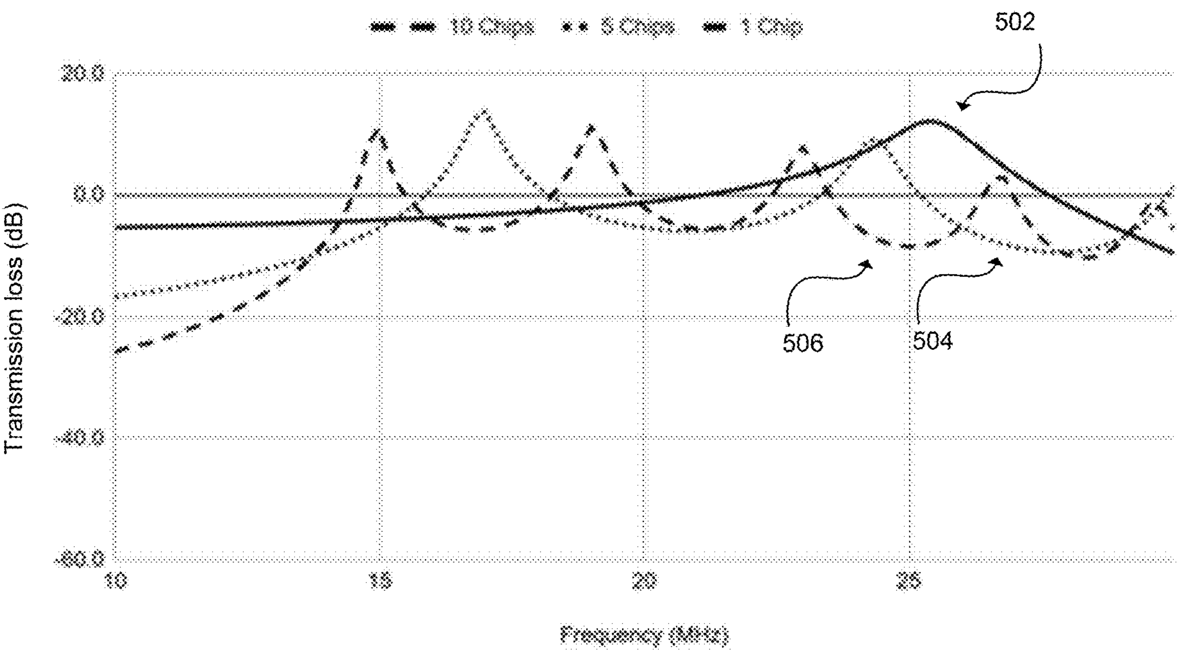
FIG. 5 is a graph 500 showing the transmission loss of stacks of resonant coupled gaming tokens.
Figure 6:
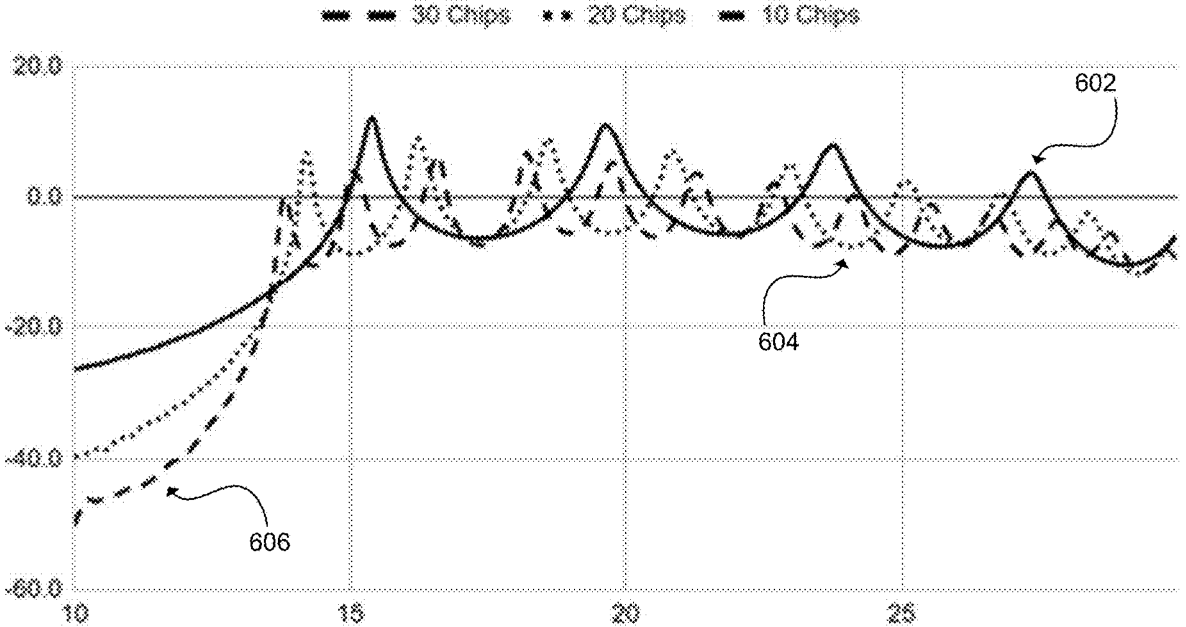
FIG. 6 is a graph 600 showing the transmission loss of stacks of resonant coupled gaming tokens.

FIGS. 5-6 show the transmission loss for resonant coupled tokens for comparison with the baseline case and the ferrite core case. Note that this data was generated using tokens having only an antenna and a parallel capacitor, without the RFID electronics or the series capacitor.

FIG. 5 is a graph 500 showing the transmission loss of stacks of resonant coupled gaming tokens (stacks of 1, 5, 10). The x-axis is the frequency in MHz, and the y-axis is the transmission loss in dB. The line 502 shows the transmission loss for 1 token, the line 504 shows the transmission loss for 5 tokens, and the line 506 shows the transmission loss for 10 tokens.

FIG. 6 is a graph 600 showing the transmission loss of stacks of resonant coupled gaming tokens (stacks of 10, 20, 30). The x-axis is the frequency in MHz, and the y-axis is the transmission loss in dB. The line 602 shows the transmission loss for 10 tokens, the line 604 shows the transmission loss for 20 tokens, and the line 606 shows the transmission loss for 30 tokens.

The line 502 (1 token) shows a single peak at about 25 MHz, indicating that this frequency is the resonant frequency of the token. As more tokens are added to the stack, the number of peaks increases. For example, the line 504 (5 tokens) shows 2 peaks, with the lowest peak at about 17 MHz. The line 506 (10 tokens) shows 5 peaks, with the lowest peak at about 15 MHz. The line 604 (20 tokens) shows 8 peaks, with the lowest peak at about 14 MHz. The line 606 (30 tokens) shows 13 peaks, with the lowest peak at about 13.5 MHz. (Note that there may be more peaks above 30 MHz that are not shown.) Additionally, as more tokens are added to the stack, the lowest resonant frequency decreases. For example, note the decreasing peak frequencies listed, going from 25 MHz (1 token) to 17 MHz (5 tokens) to 15 MHz (10 tokens) to 14 MHz (20 tokens) to 13.5 MHz (30 tokens). Finally, note that as more tokens are added to the stack, the peak with the lowest frequency approaches the transmission frequency of the RFID reader, namely 13.56 MHz, with the lowest resonant frequency of the grouping of tags generally within 10% of 13.56 MHz. In these embodiments, the tuning was optimized using the lowest resonance, but one could likewise optimize using other resonances.

The transmission loss of the resonant coupled gaming tokens is generally improved as compared to the baseline case and the ferrite core case. At 13.56 MHZ, the line 502 (1 token) has a transmission loss of about −5 dB, which is about the same as for the baseline case and the ferrite core case for 1 token. The line 504 (5 tokens) has a transmission losses of about −10 dB, which is an improvement of about 11 dB over the baseline case and about 4 dB over the ferrite core case. The line 506 (10 tokens) has a transmission loss of about −10 dB, which is an improvement of about 26 dB over the baseline case and about 9 dB over the ferrite core case. The line 604 (20 tokens) has a transmission losses of about −15 dB, which is an improvement of about 35 dB over the baseline case and about 9 dB over the ferrite core case.

Figure 7:
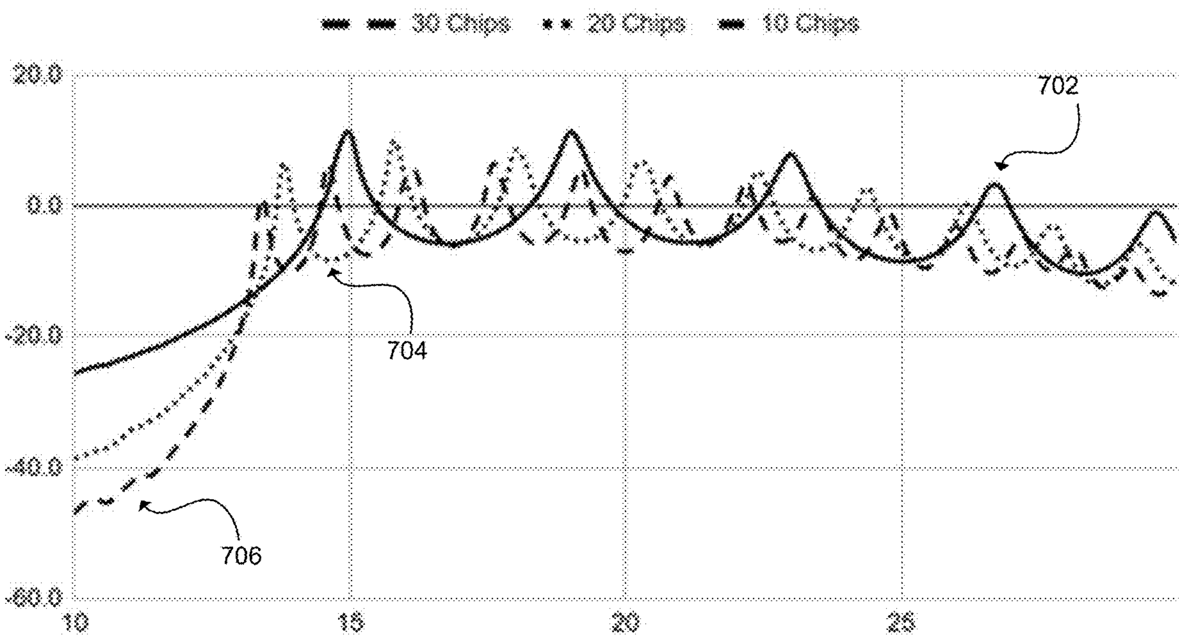
FIG. 7 is a graph 700 showing the transmission loss of stacks of resonant coupled gaming tokens.

FIG. 7 is a graph 700 showing the transmission loss of stacks of resonant coupled gaming tokens (stacks of 10, 20, 30). The x-axis is the frequency in MHz, and the y-axis is the transmission loss in dB. As compared to FIGS. 5-6, the data in FIG. 7 was generated using tokens having an antenna, a parallel capacitor, and a series capacitor, without the RFID electronics. The line 702 shows the transmission loss for 10 tokens, the line 704 shows the transmission loss for 20 tokens, and the line 706 shows the transmission loss for 30 tokens. The data in FIG. 7 shows that the presence of the series capacitor has minimal impact on the resonant coupling performance as compared to the data in FIGS. 5-6.

Figure 8:
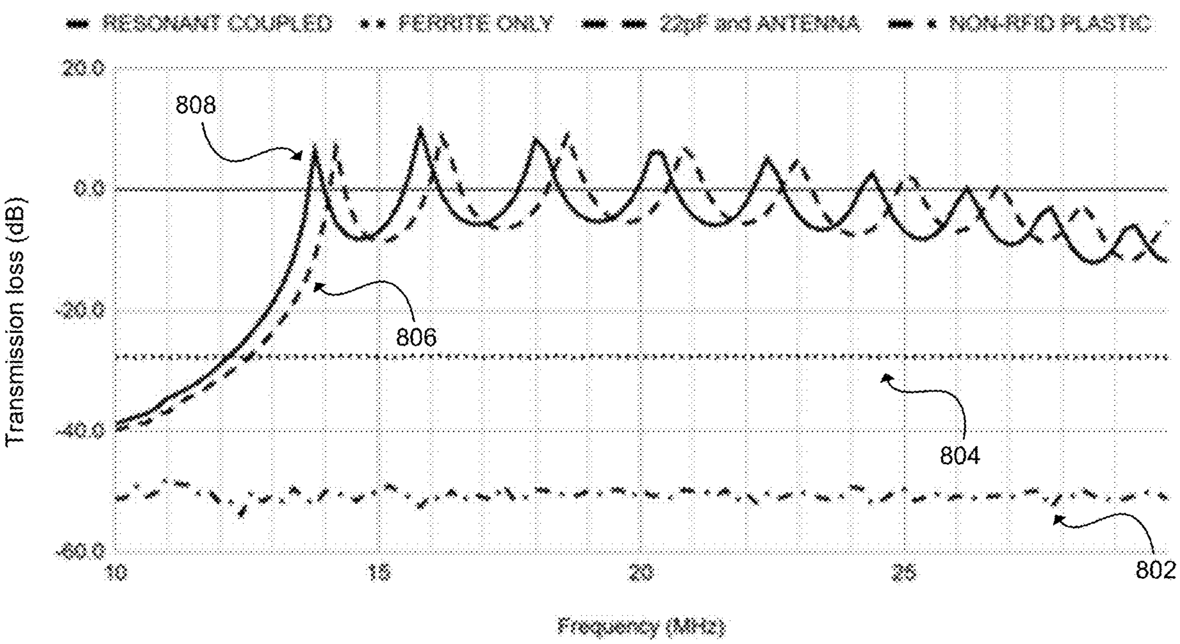
FIG. 8 is a graph 800 showing the transmission loss of different types gaming tokens.

FIG. 8 is a graph 800 showing the transmission loss of different types gaming tokens each having 20 tokens in a stack. The x-axis is the frequency in MHz, and the y-axis is the transmission loss in dB. The line 802 shows the transmission loss for plastic tokens with no RFID circuitry, no antenna, and no capacitors. The line 804 shows the transmission loss for ferrite core tokens. The line 806 shows the transmission loss for tokens having only an antenna and a parallel capacitor, without the RFID electronics or the series capacitor (e.g., similar to the setup of FIGS. 5-6). The line 808 shows the transmission loss for resonant coupled tokens having an antenna, a parallel capacitor, and a series capacitor, without the RFID electronics (e.g., similar to the setup of FIG. 7).

The resonant coupled tokens (line 808) show clear improvement in sensitivity as compared to the ferrite core tokens (line 804) over most of the frequency range 12-30 MHz. The addition of the series capacitor (line 808) compared to the tokens without the series capacitor (line 806) shifts the frequency response (as seen on the x-direction), but the magnitude of the sensitivity (as seen on the y-direction) is about the same.

Relationship Between Antenna and Parallel Capacitor

For different numbers of turns on the antenna coil (e.g., the antenna 308 of FIG. 3), the value of the tuning capacitor (e.g., the parallel capacitor 306) needs to changed so that the chosen resonant frequency (e.g., the lowest resonant frequency) of the desired stack height is near the operating frequency of the RFID reader. For example, a stack height of 30 tokens and an operating frequency of 13.56 MHz are common design targets. TABLE 1 shows the number of turns of the antenna and the capacitor value used to get the resonance near 13.56 MHz.

TABLE 1

| Number of turns | 5 | 6 | 7 | 8 | 9 | 10 | 11 | 12 | 13 | 14 | 20 | 26 |
|---|---|---|---|---|---|---|---|---|---|---|---|---|
| Capacitance (pF) | 30 | 22 | 16 | 13 | 10 | 8.2 | 6.8 | 5.6 | 4.7 | 4.3 | 2 | 1.2 |
| Single token resonance (MHz) | 23.6 | 23.7 | 23.8 | 23.5 | 24.1 | 23.6 | 23.8 | 23.7 | 23.9 | 23.3 | 23.3 | 23.5 |
| Lowest resonant frequency (MHz) | 13.9 | 13.6 | 13.7 | 13.4 | 13.6 | 13.4 | 13.5 | 13.4 | 13.6 | 13.4 | 13.4 | 13.7 |
| S21 at 13.56 MHz (dB) | −24 | −8 | −17 | −15 | −9 | −16 | −11 | −17 | −12 | −16 | −13 | −17 |

TABLE 1 shows that to result in the target resonant frequency, as the number of turns of the antenna increases, the value of the parallel capacitor is decreased. This results in a single token resonance ranging between 23.3 and 24.1 MHz, and the lowest resonant frequency for the stack of 30 tokens ranging between 13.4 and 13.9 MHz, which fits well given the excitation frequency of 13.56 MHz for the RFID reader. TABLE 1 also shows the resulting S21, where S21 is the transmission (scattering parameter) from the bottom of the stack to the top as described earlier. In this specific embodiment used to generate the data shown, the outer diameter of the antenna coil is 26 mm, and the inner diameter of the antenna decreases as the number of turns of the antenna is increased. In these experiments, the series capacitor (e.g., 204 in FIG. 2) to decouple the RFID protection circuit from the antenna is 3.9 pF for all numbers of antenna turns, and the token thickness is 3.51 mm.

Relationship Between Thickness and Parallel Capacitor

A token having an antenna with 7 turns of 26 mm outer diameter (e.g., the antenna 208 of FIG. 2) and with a series capacitor (e.g., 204 in FIG. 2) sized at 3.9 pF to decouple the protection circuit in the RFID tag is well tuned with a 16 pF capacitor across the coil for a stack height of 30 chips. If the token is thicker than 3.51 mm (i.e. the spacing between antennas), and the parallel capacitor (e.g., 206 in FIG. 2) is left unchanged, the signal level from bottom to top of the stack (S21) is dramatically reduced. This degradation can be mostly mitigated by changing the tuning capacitor (e.g., the parallel capacitor 206) so that the chosen resonant point (e.g., the lowest resonant point) is near 13.56 MHz, as shown in TABLE 2.

TABLE 2

| Thickness (mm) | 3.51 | 3.89 | 4.27 | 4.65 | 5.03 | 5.49 |
|---|---|---|---|---|---|---|
| Parallel capacitor (pF) | 16 | 18 | 20 | 22 | 24 | 27 |
| Lowest resonant frequency (MHz) | 13.7 | 13.7 | 13.7 | 13.6 | 13.6 | 13.7 |
| S21 at 13.56 MHz (dB) | −16 | −17 | −22 | −13 | −16 | −18 |

TABLE 2 shows that as the thickness of the spacing between tags (e.g., due to the thickness of the gaming token) increases, the value of the parallel capacitor can be increased to achieve the target resonant frequency.

Relationship Between Antenna Size and Parallel Capacitor

The discussion above has mainly focused on circular gaming tokens having a circular antenna. However, gaming tokens may have other form factors, including a square form factor and a rectangular form factor. In such cases, the antenna in the token may be a square antenna or a rectangular antenna. This section provides the data on rectangular gaming tokens (also referred to as plaques) having a thickness of 6 mm and a stack height of 10 plaques. The results of changing the value of the parallel capacitor are shown in TABLE 3.

TABLE 3

| Rectangular antenna dimensions (mm) | 62 × 97 | 60 × 80 | 50 × 75 |
|---|---|---|---|
| Parallel capacitor (pF) | 11 | 12.75 | 21.5 |
| Lowest resonant frequency (MHz) | 13.6 | 13.6 | 13.6 |
| S21 at 13.56 MHz (dB) | −12 | −10 | −5 |

TABLE 3 shows that as the size of the antenna increases, the value of the parallel capacitor can be decreased to achieve the target resonant frequency.

An additional test was done to demonstrate how the lensing effect resulting from the resonant coupling collimating the B-field can dramatically improve the read range of a set of plaques. Specifically, with an RFID reader operating at 1 Watt and using the same 60×80 mm plaques as in TABLE 3, the results showed that a single plaque could be read at a distance of 56 mm above the excitation antenna, while a stack of 10 plaques could be read 110 mm above the antenna—almost 2× the read range—all due to the lensing effect.

Alternative Embodiments for the Coupling Circuit

As discussed above, the RFID tag 200 (see FIG. 2) includes a series circuit element 204 for lightly coupling the tag electronics 202 to the antenna 208, sufficient to power the RFID integrated circuit and to minimize the impact of the protection circuit such that as much of the remaining excitation energy is available to energize other tags. However, instead of a capacitor, a resistor or an inductor (or a combination of one or more of the three elements) can also be used for this purpose. In such a case, the series circuit element 204 may include one or more of a capacitor, an inductor and a resistor.

Figure 9:
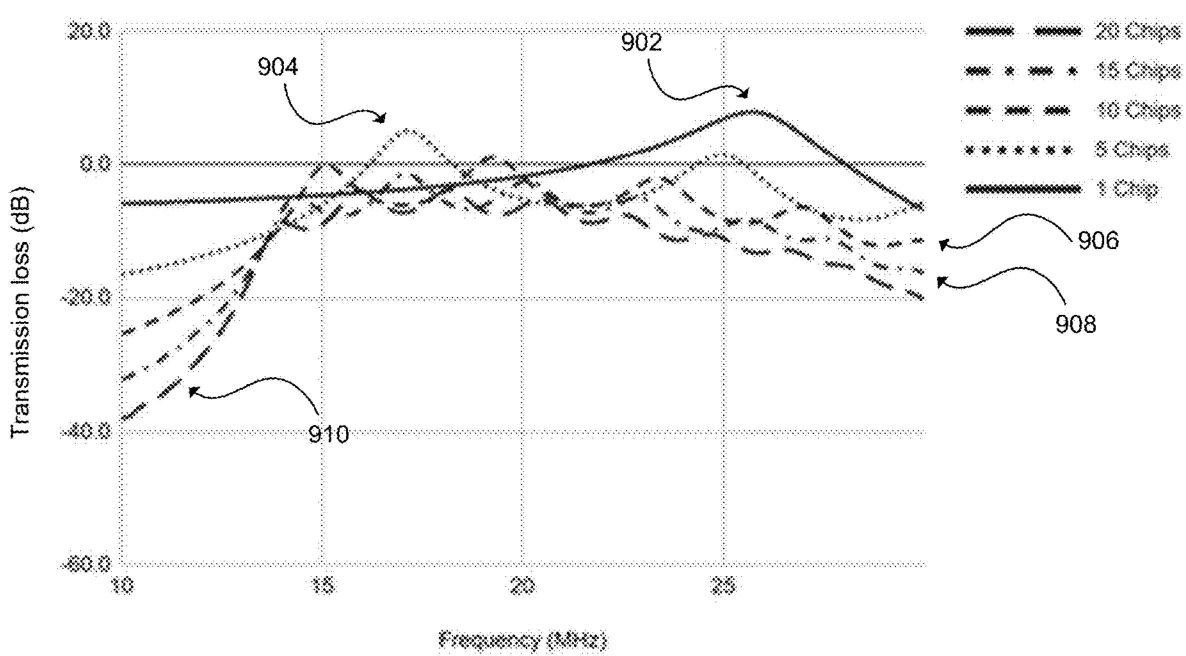
FIG. 9 is a graph 900 showing the transmission loss of stacks of resonant coupled gaming tokens with the coupling capacitor replaced by a resistor.

FIG. 9 is a graph 900 showing the transmission loss of stacks of resonant coupled gaming tokens with the coupling capacitor (e.g., the series circuit element 204) replaced by a resistor of 3.92 kOhms. The x-axis is the frequency in MHz, and the y-axis is the transmission loss in dB. The line 902 shows the transmission loss for 1 token, the line 904 shows the transmission loss for 5 tokens, the line 906 shows the transmission loss for 10 tokens, the line 908 shows the transmission loss for 15 tokens, and the line 910 shows the transmission loss for 20 tokens. As compared to FIG. 7, the transmission loss is similar but slightly worse. Thus, a resistor may be used as a series element instead of the series capacitor.

Figure 10:
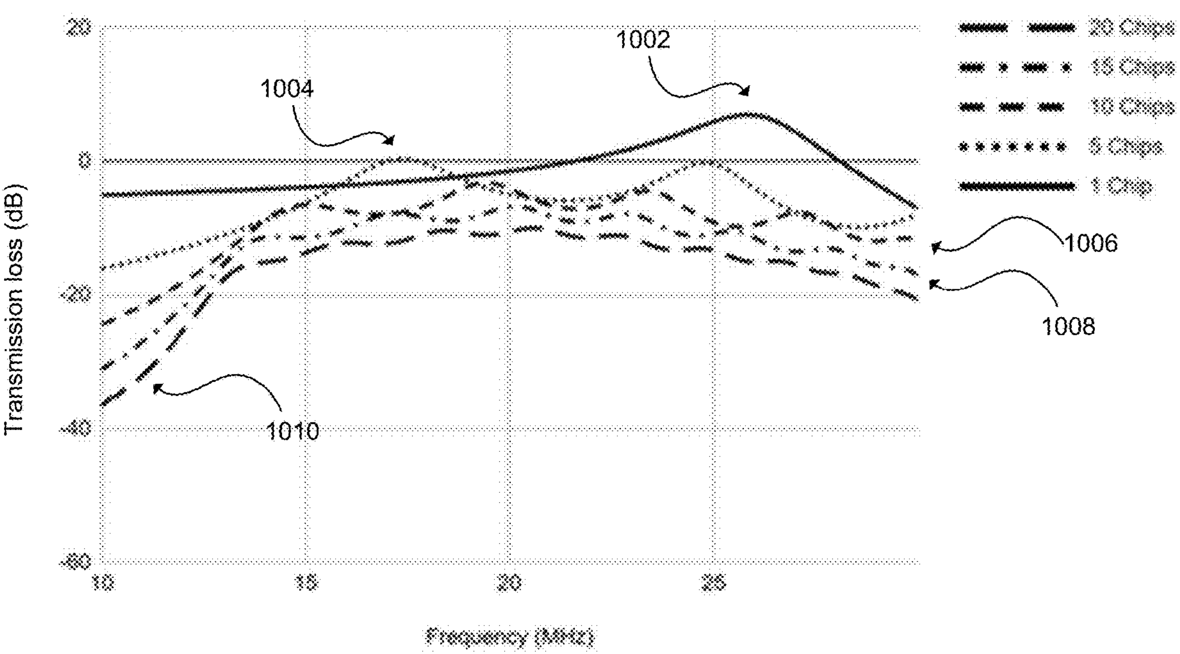
FIG. 10 is a graph 1000 showing the transmission loss of stacks of resonant coupled gaming tokens with the coupling capacitor replaced by an inductor.

FIG. 10 is a graph 1000 showing the transmission loss of stacks of resonant coupled gaming tokens with the coupling capacitor (e.g., the series circuit element 204) replaced by an inductor of 27 uH. The x-axis is the frequency in MHz, and the y-axis is the transmission loss in dB. The line 1002 shows the transmission loss for 1 token, the line 1004 shows the transmission loss for 5 tokens, the line 1006 shows the transmission loss for 10 tokens, the line 1008 shows the transmission loss for 15 tokens, and the line 1010 shows the transmission loss for 20 tokens. As compared to FIG. 7, the transmission loss is similar but slightly worse. Thus, an inductor may be used as a series element instead of the series capacitor.

Together, the results shown in FIGS. 7 and 9-10 demonstrate that the series coupling element (e.g., the series circuit element 204) may include one or more of a capacitor, a resistor and an inductor that are appropriately sized based on the other components of the resonant coupled gaming token.

Comparison Between Ferrite Core and Resonant Coupled Tokens

The inventors conducted an experiment between a set of ferrite core gaming tokens and a set of resonant coupled gaming tokens. The experimental setup included a single antenna with a well-defined boundary, a fixed power level for the transmission from the RFID reader, a stack of 30 ferrite core tokens, and a stack of 30 resonant coupled tokens, with both types of tokens being circular with a 39 mm diameter.

Both types of tokens exhibited comparable results regarding the signal strength. This was an unexpected result based on previous work on the ferrite core tokens, as it had previously been thought that the presence of the ferrite core was needed in order to provide good signal strength results. The performance of the resonant coupled tokens was thus an unexpected result.

For both types of tokens, the boundary of the antenna resulted in a high signal level inside the boundary, a low signal level at the boundary, and a mid-level signal level outside the boundary, where the mid-level signal decreased with increasing distance outside of the boundary. These different signal levels were detectable by the system to correctly locate the position of the token for both types of tokens. For example, when there were two adjacent gaming spots, the detectable difference in signal levels enabled the system to correctly determine which of the adjacent gaming spots contained the stack of tokens.

The experiment further showed that the resonant coupled tokens exhibited a higher signal strength outside of the boundary as compared to the ferrite core tokens. This was a further unexpected result of the resonant coupled tokens, given the existing experience with the ferrite core tokens. The signal strength outside the boundary was still lower than that inside the boundary, so the different signal levels enabled the system to correctly assign each gaming token to its proper coordinates on a gaming table (and in a monetary gaming context, to correctly determine the value of each bet at a particular betting spot).

Additional Embodiments

While the embodiments described in this document focus on their application to the design of RFID-enabled 39 mm gaming tokens, the resonant coupling phenomenon can be applied to non-gaming applications. One example of a non-gaming application addresses packaging of pharmaceuticals.

One issue faced by caregivers is compliance and adherence to a drug prescription regimen. A common practice is to provide a pill box containing a compartmentalized grid of bins in which pills are placed, where each bin corresponds to a dosage time and the pills are allocated to each bin according to the dosage schedule. For example, a pill box may include 7 columns (corresponding to the days of the week) and 4 rows (corresponding to 4 dosage times, such as at breakfast, at lunch, at dinner, and before bed).

Instead of manual allocation of the pills into the bins of the pill box, a stack of RFID-enabled packages containing the pills may be filled and provided to the patient. The RFID detection system tracks the inventory and usage of the pills as the patient removes each pill package for administration.

Enumerated Example Embodiments

Various aspects of the present invention may be appreciated from the following enumerated example embodiments (EEEs).

EEE 1. A system for determining locations of objects in a gaming environment, the system including radio-frequency identification (RFID) antennas arranged at locations on a gaming table, one or more RFID readers coupled to the RFID antennas, and RFID tags. A given RFID tag of the plurality of RFID tags includes RFID tag electronics, an antenna coupled to the RFID electronics, and a circuit element connected in parallel with the antenna, wherein the circuit element includes a capacitor. The given RFID tag has a resonant frequency resulting from the antenna and the circuit element, wherein the resonant frequency of the given RFID tag is higher than an excitation frequency of a transmission generated by the one or more RFID readers. The RFID tags are in proximity in a grouping, wherein the grouping of RFID tags shapes a magnetic flux density field of the transmission generated by the one or more RFID readers through the grouping of RFID tags, wherein the grouping of RFID tags has a resonant frequency that is lower than the resonant frequency of each of the plurality of RFID tags considered individually due to resonant coupling, and wherein the transmission generated by the one or more RFID readers powers the RFID tag electronics via the resonant coupling.

EEE 2. The system of EEE 1, wherein the grouping includes at least one stack of RFID tags.

EEE 3. The system of EEE 2, wherein the at least one stack includes at least two fully overlapping RFID tags.

EEE 4. The system of EEE 2, wherein the at least one stack includes at least two partially overlapping RFID tags.

EEE 5. The system of any one of EEE 1-4, wherein the grouping includes a pile of RFID tags.

EEE 6. The system of EEE 1, wherein the grouping includes at least one stack of RFID tags and at least one pile of RFID tags.

EEE 7. The system of any one of EEE 1-6, wherein a number of turns of the antenna is selected based on a capacitance of the capacitor, wherein a selected number of turns increases as the capacitance decreases.

EEE 8. The system of any one of EEE 1-7, wherein the RFID tag has a thickness of between 3.51 and 5.49 mm, and wherein a capacitance of the capacitor includes between 16 and 27 pF.

EEE 9. The system of any one of EEE 1-8, wherein a capacitance of the capacitor is selected based on a thickness of the RFID tag, wherein a selected capacitance decreases as the thickness decreases.

EEE 10. The system of any one of EEE 1-9, wherein a capacitance of the capacitor is selected based on a size of the antenna, wherein a selected capacitance decreases as the size increases.

EEE 11. The system of any one of EEE 1-10, further comprising a housing having a circular form factor.

EEE 12. The system of any one of EEE 1-11, wherein the antenna includes a loop antenna having more than one loop.

EEE 13. The system of any one of EEE 1-11, wherein the antenna includes a loop antenna having five loops.

EEE 14. The system of any one of EEE 1-10 and 12-13, further comprising a housing having a rectangular form factor.

EEE 15. The system of any one of EEE 1-14, wherein the excitation frequency of the transmission generated by the RFID reader is between 13 and 14 MHz.

EEE 16. The system of any one of EEE 1-15, wherein the excitation frequency of the transmission generated by the RFID reader is 13.56 MHz.

EEE 17. The system of any one of EEE 1-16, wherein a lowest resonant frequency of the grouping of RFID tags approaches within 10% below the excitation frequency of the RFID reader as each RFID tag is added to the grouping of RFID tags.

EEE 18. The system of any one of EEE 1-17, wherein the circuit element is a component of the RFID tag electronics.

EEE 19. The system of any one of EEE 1-17, wherein the circuit element is a separate component from the RFID tag electronics.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A radio-frequency identification (RFID) tag, comprising:

RFID tag electronics; and an antenna coupled to the RFID electronics, wherein the RFID tag has a resonant frequency, wherein the resonant frequency of the RFID tag is higher than an excitation frequency of a transmission generated by an RFID reader, wherein the RFID tag is one of a plurality of RFID tags in proximity in a grouping, wherein the grouping of RFID tags shapes a magnetic flux density field of the transmission generated by the RFID reader through the grouping of RFID tags, wherein the grouping of RFID tags has a resonant frequency that is lower than the resonant frequency of each of the plurality of RFID tags considered individually due to resonant coupling, and wherein the transmission generated by the RFID reader powers the RFID tag electronics via the resonant coupling.

2. The RFID tag of claim 1, wherein the resonant frequency of the RFID tag results from the antenna.

3. The RFID tag of claim 1, wherein the resonant frequency of the RFID tag results from a capacitance of the antenna.

4. The RFID tag of claim 3, wherein the antenna has a number of turns, wherein the capacitance of the antenna increases as the number of turns increases.

5. The RFID tag of claim 1, wherein the resonant frequency of the RFID tag results from an inductance of the antenna.

6. The RFID tag of claim 1, wherein the resonant frequency of the RFID tag results from an inductance and a capacitance of the antenna.

7. The RFID tag of claim 1, wherein the resonant frequency of the RFID tag results from the RFID tag electronics and the antenna.

8. The RFID tag of claim 1, further comprising:

a circuit element connected in parallel with the antenna, wherein the resonant frequency of the RFID tag results from the antenna and the circuit element.

9. The RFID tag of claim 8, wherein the resonant frequency of the RFID tag results from the RFID tag electronics, the antenna and the circuit element.

10. The RFID tag of claim 1, further comprising:

a circuit element connected in series between the antenna and the RFID tag electronics, wherein the resonant frequency of the RFID tag results from the antenna, the circuit element and the RFID electronics.

11. A system for determining locations of objects in a gaming environment, the system comprising:

a plurality of radio-frequency identification (RFID) antennas arranged at a plurality of locations on a gaming table;

one or more RFID readers coupled to the plurality of RFID antennas; and a plurality of RFID tags, wherein a given RFID tag of the plurality of RFID tags comprises:

RFID tag electronics; and an antenna coupled to the RFID electronics, wherein the given RFID tag has a resonant frequency, wherein the resonant frequency of the given RFID tag is higher than an excitation frequency of a transmission generated by the one or more RFID readers, wherein the plurality of RFID tags are in proximity in a grouping, wherein the grouping of RFID tags shapes a magnetic flux density field of the transmission generated by the one or more RFID readers through the grouping of RFID tags, wherein the grouping of RFID tags has a resonant frequency that is lower than the resonant frequency of each of the plurality of RFID tags considered individually due to resonant coupling, and wherein the transmission generated by the one or more RFID readers powers the RFID tag electronics via the resonant coupling.

12. The system of claim 11, wherein the resonant frequency of the given RFID tag results from the antenna.

13. The system of claim 11, wherein the resonant frequency of the given RFID tag results from a capacitance of the antenna.

14. The system of claim 13, wherein the antenna has a number of turns, wherein the capacitance of the antenna increases as the number of turns increases.

15. The system of claim 11, wherein the resonant frequency of the given RFID tag results from an inductance of the antenna.

16. The system of claim 11, wherein the resonant frequency of the given RFID tag results from an inductance and a capacitance of the antenna.

17. The system of claim 11, wherein the resonant frequency of the given RFID tag results from the RFID tag electronics and the antenna.

18. The system of claim 11, wherein the given RFID tag further comprises:

a circuit element connected in parallel with the antenna, wherein the resonant frequency of the RFID tag results from the antenna and the circuit element.

19. The system of claim 18, wherein the resonant frequency of the given RFID tag results from the RFID tag electronics, the antenna and the circuit element.

20. The system of claim 11, further comprising:

a control system, wherein in response to the transmission generated by the one or more RFID readers and the RFID electronics being powered, the given RFID tag communicates an RFID tag identifier, and wherein, in response to receiving the RFID tag identifier, the control system associates the given RFID tag with a location on the gaming table corresponding to one or more of the plurality of RFID antennas.

* * * * *